Figure 1:
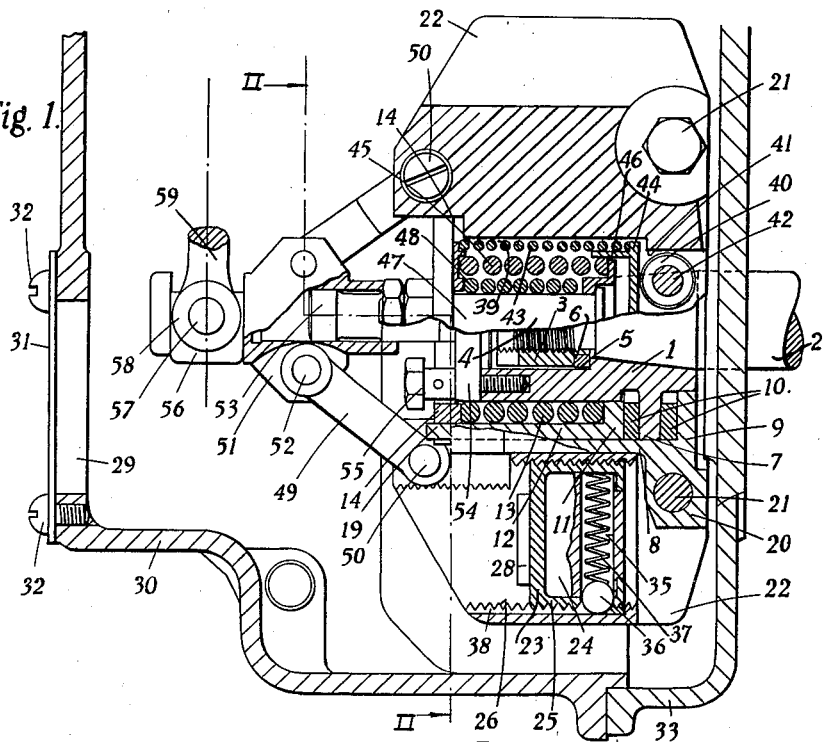

Sept. 3, 1940.　　　　　F. H. SEELEY　　　　　2,213,824
CENTRIFUGAL GOVERNOR
Filed Dec. 31, 1938　　　　2 Sheets-Sheet 1

Frank Harold Seeley
Inventor by his Attorney

Sept. 3, 1940.  F. H. SEELEY  2,213,824
CENTRIFUGAL GOVERNOR
Filed Dec. 31, 1938  2 Sheets-Sheet 2
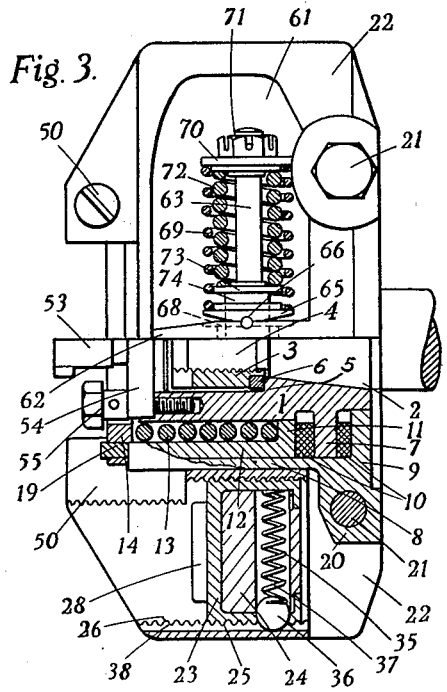
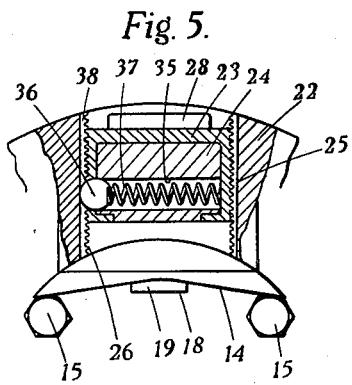
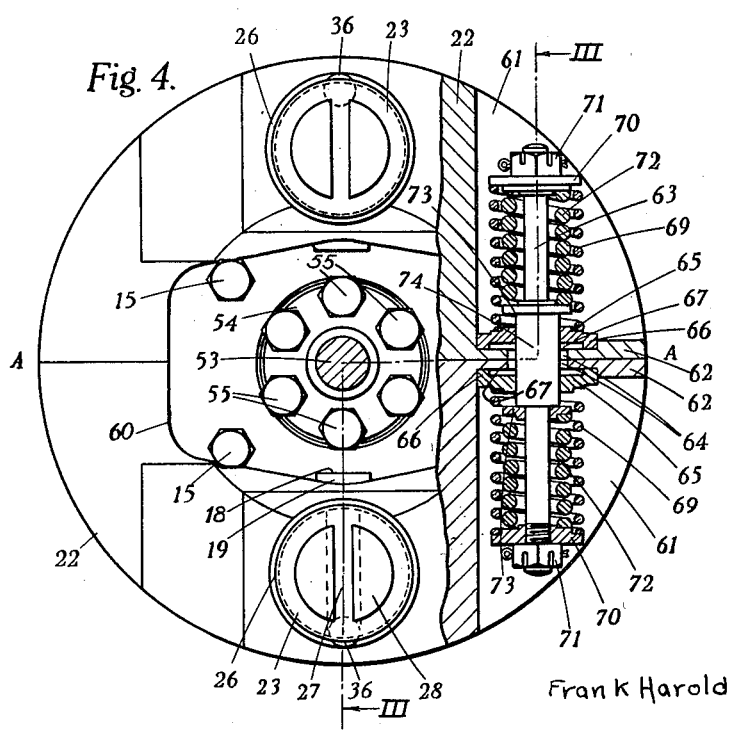
Inventor
Frank Harold Seeley
His Attorney Patented Sept. 3, 1940

2,213,824

UNITED STATES PATENT OFFICE 2,213,824

CENTRIFUGAL GOVERNOR

Frank Harold Seeley, Loughborough, Leicestershire, England, assignor to Bryce Limited, Kelvin Works, Hackbridge, Surrey, England Application December 31, 1938, Serial No. 248,692
In Great Britain January 13, 1938

12 Claims. (Cl. 264—3)

This invention relates to centrifugal governors, particularly those for use with compression-ignition engines and to be fitted to the camshafts of the fuel pumps. Such governors may be of the two-speed type, automatically controlling the idling and maximum speeds of the engine, and through an associated auxiliary device enabling direct manual control of the intermediate range of speeds. The invention is applicable to this as well as to other types of governors.

The space available for such a governor, which is usually of the spring-loaded type, is strictly limited, and in order to facilitate access to the springs for their adjustment and consequently adjustment of the governor speed, the springs have been located in bores at the centres of the weights. However, the boring out of each weight to take the loading springs brings the centre of gravity of each weight nearer to the rotational axis whereas, in view of the limited space available, it is desirable to have the centre of gravity of each weight as far as possible from the rotational axis.

The present invention provides an advantageously improved centrifugal governor in which the adjustment of the governor speed is effected by displacement of one of two parts comprising each weight so that the centre of gravity of the weight is displaced within its dimensions. Accessibility of the loading springs for adjustment is thereby rendered unnecessary, and they may be removed to positions wherein their housing recesses detract to the least possible extent from the effective mass of the weights, so that the centres of gravity of the latter may be located, in a zone determined by the adjustment of the displaceable part, as far as possible from the governor axis within the available limits of space.

Accordingly the invention has for an object to provide a centrifugal governor including, in combination, a plurality of weights and rotatable means carrying said weights, each weight comprising one part attached to said carrying means, said part having an internally screw-threaded aperture, a heavy, externally screw-threaded plug part adjustably engaged in said aperture and spring-loaded locking means in said plug for securing it against displacement from its adjusted position by accidental rotation in the aperture.

A further object of the invention is to provide a governor adjustable as aforesaid and including, in combination, a plurality of symmetrically disposed weights which are complementary sectors wholly occupying in their inner limit positions a cylindrical space the axial length of which is less than its diameter, with rotatable carrying means and loading spring means located within said space, namely, within recesses in the weights, each weight comprising a part associated with said carrying means, and having an internally screw-threaded aperture, and a heavy, externally screw-threaded plug adjustable in said aperture to displace the centre of gravity of the weight, and loading springs being disposed to be engaged each by the adjacent abutment means of two weights.

The line of movement of the adjustable plug in each weight may be arranged either to alter the radius from the governor rotational axis to the centre of gravity of the weight or, when the weights are pivoted to their carrying member, to alter the moment of the centre of gravity of the weight about its fulcrum.

A spring-loaded centrifugal governor according to the invention may have two or more weights symmetrically arranged about the governor axis, with loading springs disposed, for engagement by the adjacent sides of the or each two weights, either substantially normal or substantially parallel to the governor rotational axis, leaving the material or mass of each weight unaffected. Accordingly, the governor is particularly suitable for fitting, in the limited space available, to the fuel pump camshaft of a compression-ignition engine, since, although the side disposition of the loading springs may render them less easily accessible, this is unimportant because adjustment of the governor speed is effected by adjusting the governor weights and not the springs. Easy access to the variable parts of the governor weight can be had through an opening in the governor casing, the adjustment being effected by a screw driver or similar tool inserted through said opening.

The governor may, for example, comprise two or more weights pivoted each on a pin disposed tangentially in a common plane normal to said axis, abutment means at the sides of each weight, and loading spring means bearing simultaneously on each adjacent pair of said abutment means, the spring means being disposed to exert reaction in directions parallel to the governor axis. Such spring loading means may comprise individual springs or groups of springs of the helical compression type, the abutment means on each weight being located so that a line through them parallel to the pivot pin of the weight is at a smaller perpendicular distance from the governor axis than said pin.

Alternatively, the governor may have a pair of substantially saddle-shaped weights each with recesses at both sides, abutment means being located one in each of said recesses and loading spring means, e. g., single helical springs or groups of helical springs, being disposed in the complementary recesses at each side of the pair of weights, transversely to the diametrical plane of symmetry between the weights, and engaged by the pair of abutment means located in said complementary recesses.

Figure 2:
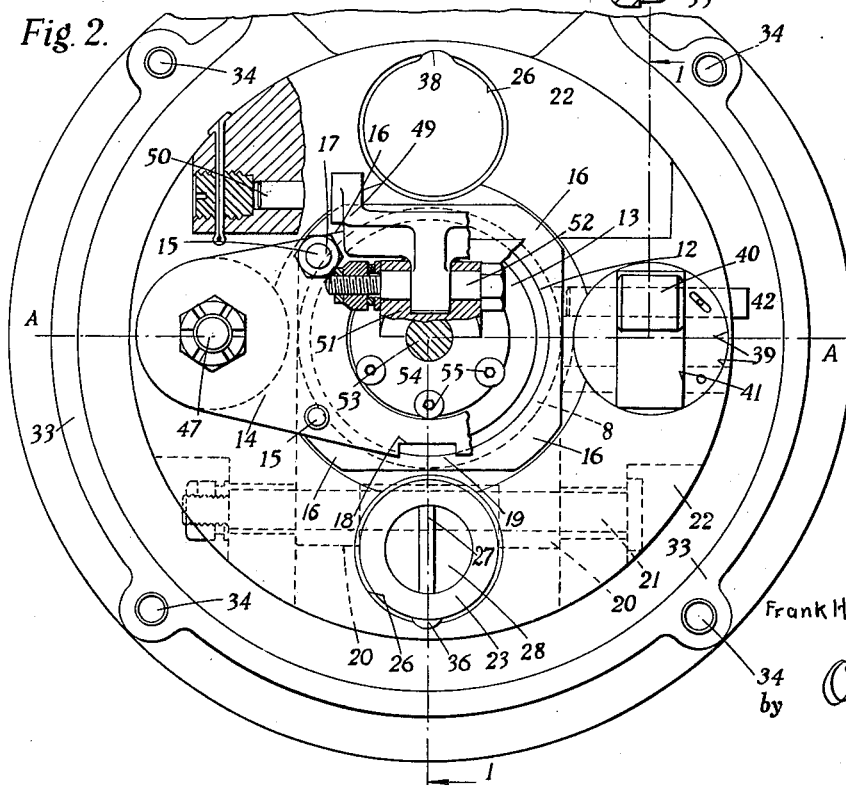

By way of example, two constructional forms of spring-loaded centrifugal governors in accordance with the invention will be described with reference to the accompanying drawings, wherein Fig. 1 is a vertical section of one embodiment, partly in the plane of the axis, and partly parallel to said plane on the line I—I shown in Fig. 2, Fig. 2 is a transverse section, broken away in parts, on the line II—II shown in Fig. 1, Fig. 3 is a vertical section of the other embodiment, partly in the plane of the axis and partly parallel to said plane on the line III—III shown in Fig. 4, Fig. 4 is a transverse elevation of the same, partly in section, corresponding to Fig. 2, and Fig. 5 illustrates a modification.

In the embodiment shown in Figs. 1 and 2, the driven member of the governor is an assembly embodying a friction clutch. A hub member 1 is secured to the tapered end 2 of a fuel pump camshaft, by means of a key (not shown) and a screwed locking sleeve 3, the latter engaging a screwed spigot 4 on the end of the camshaft and bearing on an internal shoulder 5 within the hub member 1, a spring washer 6 being interposed. The hub 1 has an external flange 7 a short distance from its inner end. Loosely surrounding the hub 1 and its flange 7 is a sleeve member 8 having at its inner end an internal flange 9. Two annular friction members 10 are disposed about the hub 1, their adjacent surfaces engaging the opposite sides of the flange 7 thereon, while their remoter surfaces are engaged respectively by the flange 9 on the sleeve 8 and a similar flange 11 on a sleeve 12. The latter is slidable within the sleeve 8 under the force of a compression coil spring 13, to maintain the friction members 10 engaged between the flanges 7, 9 and 11. A fixed abutment for the spring 13 is afforded by a transverse keeper plate 14 secured upon studs 15, seated in four lugs 16 projecting radially from the outer end of the sleeve 8, by means of nuts 17 (see Fig. 2). The keeper plate 14 has two diametrically opposed recesses 18 slidably engaged by axial projections 19 on the sleeve 12, whereby the members 8, 12 and 14 and the spring 13, are rendered rotatable as a unitary assembly by means of the friction clutch.

The driven sleeve 8 has two diametrically opposed pairs of lugs 20 supporting tangentially disposed bolts 21 constituting pivots for a pair of saddle-shaped weights 22, which together surround the sleeve 8.

According to the characteristic feature of the invention, each of the weights 22 comprises a relatively adjustable part. As shown in Figs. 1 and 2, this part is constituted by a hollow cylindrical plug 23 with a lead filling 24. The peripheral surface of the plug has an external screw thread 25 engaging in an internally screw-threaded aperture 26 in the weight. Displacement of a plug in its aperture is effected by rotating the plug as by means of a screw driver or equivalent tool engaged in a diametrical slot 27 in a boss 28 on the end of the plug. The apertures 26 in the weights are disposed substantially parallel to the rotational axis of the governor, so that displacement of the plugs 23 as aforesaid alters the moment of the weights about the axes of the pivot bolts 21. The plugs are readily accessible for adjustment through an aperture 29 in the casing 30, upon removal of a cover plate 31 secured by screws 32. The casing 30 is itself secured to a back-plate 33, which may if desired be integral with the fuel pump casing, by means of studs 34 (Fig. 2).

For locking the adjustable plugs 23 automatically in any desired position, in each of them a bore 35 is provided diametrically through the peripheral wall at one side and the filling 24, to house a catch in the form of a ball 36 urged outwardly by a spring 37. A longitudinal arcuate groove 38 is provided in the screw-threaded surface of each of the apertures 26 in the weights. The ball 36 under the action of its spring projects into the groove 38. By this means the plug is held against accidental or unintentional displacement from its adjusted position. However, when it is desired to adjust the position of the plug, in the turning of the latter the ball is forced inwards in opposition to the spring 37 by riding upon the screw thread. Nevertheless, at each complete turn of the plug the ball will automatically re-engage with the groove. It follows that this arrangement enables very fine adjustment of the centre of gravity of the governor weight, with respect to its pivot, i. e., the bolt 21, to vary the moment of the weight about the pivot and consequently the effective control range of the governor speed, without variation of the loading, in an extremely simple fashion and under the safeguard of automatic retention of the plug 23 in its adjusted position.

The loading springs are disposed at the sides of the governor weights. As shown in Figs. 1 and 2, the sides of the saddle-shaped weights 22 abut one another on a diametrical plane A—A in the inner limit positions of the weights. A hemi-cylindrical recess 39 is effected in the forward part of each end surface of both weights, and at the bottom of each recess a roller 40 is located in a rectangular recess 41 on a transverse pin 42. The loading springs are in groups of three concentric, helical, compression springs as shown in Fig. 1, the keeper plate 14 affording a fixed abutment. An idling spring 43 in each group extends from said plate, within the cylindrical space presented by the complementary recesses 39 at each side, to a cup member 44 which is engaged jointly by the two rollers 40, one attached to each weight, at the bottoms of said recesses. A secondary spring 45 extends between said plate 14 and the outer flange of a Z-section annular member 46 for which the head of a bolt 47 fixed in the plate 14 forms a limiting abutment, and a spring 48 closely surrounds the bolt 47 and extends from the plate 14 to the inner flange of the member 46, said springs 45 and 48 jointly coming into operation for maximum speed control.

The rollers 40 are parallel to the bolts 21 on which the weights 22 are pivoted and the perpendicular distance of the axis of the two rollers in each weight from the governor rotational axis is less than that of the bolt 21 on which the weight pivots, so that in operation the centrifugal force on the weights exerts a first order leverage on the springs. The rollers at each side first compress the idling spring 43 until the base of the cup member 44 engages the member 46, which range of movement may, in a two-speed governor, provide control of the idling speed of the engine. Any further movement of the weights is resisted jointly by all three springs 43, 45 and 48, providing, in association with an auxiliary, manually-controlled device (not shown) which is preferably interconnected with or constitutes the engine speed control, a free range of speed up to an absolute maximum determined by the governor, irrespective of engine load, at the limit position of said manually-controlled device.

No provision is or need be made for adjusting the initial compression of any of the loading springs, or varying said initial compression at any time, as the effective control range of speed is adjustable to any required extent, with great precision, by displacement of the loaded plugs 23 in the weights.

For transmitting the centrifugal motion of the weights 22 to the controlled means (e. g., the spill devices in a fuel pump) a forked link 49 is articulated to each weight by means of pins 50 at one end and to a crosshead sleeve 51 by means of a pin 52 at the other end. The crosshead sleeve 51 is slidable on a spigot 53 integral with a disc 54 secured directly to the hub member 1 of the governor by an annular series of set screws 55. The outer end of the sleeve 51 has an annular groove housing a collar 56 which presents trunnions 57 engaged by eyes 58 of a forked lever 59 whereby the governor motion is transmitted to the controlled means.

The axial displacement of the crosshead sleeve 51 is, of course, dependent on the radial displacement of the pins 50 by which the links 49 are anchored to the governor weights. The position taken up by the governor weights at any particular angular velocity depends on the attainment of a state of balance between the centrifugal force of the gyrating weights, applied as a moment about their pivot bolts 21 and the reaction of the loading springs applied as an opposing torque about the same bolts through the arm represented by the perpendicular distance between the axes of the bolts 21 and the abutment rollers 40. By variation of the positions of the loaded plugs 23 in the governor weights, the moment of each weight may be correspondingly varied, and it therefore follows that when the moment is increased, by displacing the plugs outwards towards the front faces of the weights, the state of balance is attained only by a greater compression of the loading springs, and vice versa. By the adjustment of the position of the loading plugs, therefore, the governor weights may be caused to take up any position necessary to effect a required displacement of the crosshead sleeve 51 at a particular speed.

Evidently, a governor as described with reference to Figs. 1 and 2 may be modified by the provision of more than two weights, with a corresponding increase in the number of loading springs or groups of loading springs so that one spring or group of springs is disposed between the adjacent surfaces of each two weights. In such arrangement, of course, each weight will be pivoted on an axis tangential to the governor rotational axis, with the abutment rollers in parallel relationship thereto.

Figs. 3 and 4 show a modified arrangement, wherein the loading springs are disposed transversely to the diametrical plane of symmetry A—A of the governor and weights. In this modification the weights are mounted on a sleeve member 8 driven through a friction clutch as above described, the only member of the driven assembly to be modified being the keeper plate 60, which is no longer required to afford abutments for the loading springs. A recess 61 is formed at both sides of each weight, the latter presenting at its face adapted to engage the corresponding face of the other weight, an abutment ledge 62 traversing the recess. A double-ended spring retaining bolt 63 extends through apertures 64 in the ledges 62, perpendicularly to the plane A—A. Spring supporting washers 65 are provided each with a pair of trunnions 66 engaging in a hemicylindrical groove 67 effected radially in the ledge 62. The inner surfaces of the washers 65 are made convex as shown in Fig. 3, and the ledges are further formed with annular recesses 68, so that as the washers 65 tilt about their trunnions 66 under the separation of the weights by pivoting about the bolts 21, contact between the inner surfaces of the washers 65 and the opposite surfaces of the ledges 62 is avoided. An idling spring 69 extends from the outer surface of each washer 65 to the inner surface of a retaining washer 70 which abuts a securing nut 71 screwed on to each end of the bolt 63. A maximum speed control spring 72, located concentrically within the idling spring 69, extends from the washer 70 inwards to a washer 73, the latter being seated on an enlargement 74 at the middle of the bolt 63.

With a governor loaded as shown in Figs. 3 and 4, during the lower range of engine speed, the radial displacement of the weights is resisted only by the lighter springs 69, until the outer surfaces of the washers 65 engage the inner surfaces of the washers 73, whereupon the displacement of the weights is resisted by the two springs 69 and 72 in each group jointly to afford control of the maximum running speeds. No provision is made for the adjustment of the initial compression of the loading springs, since as above described the adjustment is effected entirely by displacing the plugs 23 to effect variation of the moment of each weight about its pivot bolt 21. Except for the fact that the loading springs exert a restraining torque on the weights in direct opposition to the centrifugal force, the operation is exactly the same as above described in reference to Figs. 1 and 2.

Fig. 5 corresponds to the upper part of Fig. 4 and shows a modification wherein the loaded plug in each weight is disposed to be movable radially so as to effect displacement of the centre of gravity of the weight relative to the rotational axis of the governor instead of varying the moment of the weight about its pivot. Since this radius is a factor in the centrifugal force, the effect is the same as that attained by varying the moment. The construction is identical with that above described, except that the internally screw-threaded aperture 26 is effected radially in the weight, the plug 23 with its lead filling being otherwise as previously described, including the provision of a ball 36 loaded by a spring 37 and housed in a transverse aperture 35 to engage automatically with a longitudinal groove 38 in the periphery of the aperture 25 for automatically locking the weight in any desired position of adjustment.

Constructional modifications may be made without exceeding the scope of the invention. For example, the friction clutch may be omitted. Loading spring means other than compression coil springs may be employed. In the case of a governor having weights whose centres of gravity are displaceable radially according to Fig. 5, the weights may be mounted for radial sliding movement instead of being pivoted. Each of the recesses accommodating the loaded plugs may have a plurality of longitudinal grooves for engagement by the locking means associated with the plugs upon partial turning of the latter.

I claim:

1. A centrifugal governor including, in combination, a plurality of weights and rotatable means carrying said weights, each weight comprising one part attached to said carrying means, said part having an internally screw-threaded aperture, a heavy, externally screw-threaded plug part adjustably engaged in said aperture, and spring-loaded locking means in said plug for securing it against displacement from its adjusted position by accidental rotation in the aperture.

2. A centrifugal governor including, in combination, a plurality of weights and a rotatable member carrying said weights, each weight comprising one part pivoted tangentially to said member, said part having an internally screw-threaded aperture extending, in the inner limit position of the weight, substantially parallel to the rotational axis of the carrying member, a heavy, external screw-threaded plug part displaceably engaged in said aperture, and spring-loaded locking means in said plug for securing it against displacement from its adjusted position by accidental rotation in the aperture.

3. A centrifugal governor according to claim 1, wherein the internally screw-threaded aperture in each weight is radially disposed.

4. A centrifugal governor including, in combination, a plurality of weights and a rotatable member carrying said weights, each weight comprising a part pivoted tangentially to said member, said part having an internally screw-threaded aperture extending, in the inner limit position of the weight, substantially parallel to the rotational axis of the carrying member, at least one longitudinal groove in the threaded surface of said aperture, a heavy externally screw-threaded plug displaceably engaged in said aperture, a transverse bore in the plug, and a spring-loaded catch housed in said bore and projecting therefrom to engage in said groove.

5. A centrifugal governor including, in combination, a plurality of weights and rotatable means carrying said weights, each weight comprising a part attached to said carrying means, said part having an internally screw-threaded radial aperture, at least one longitudinal groove in the threaded surface of said aperture, a heavy externally screw-threaded plug displaceably engaged in said aperture, a transverse bore in the plug, and a spring-loaded catch housed in said bore and projecting therefrom to engage in said groove.

6. A centrifugal governor including, in combination, a plurality of symmetrically disposed weights which are complementary sectors occupying in their inner limit positions a cylindrical space the axial length of which is less than its diameter, with rotatable carrying means and loading spring means located within said space, namely, within recesses in the weights, each weight comprising a part associated with said carrying means, and having an internally screw-threaded aperture, and a heavy, externally screw-threaded plug adjustable in said aperture to displace the centre of gravity of the weight.

7. A centrifugal governor including, in combination, a plurality of weights which are complementary sectors occupying in their inner limit positions a cylindrical space, with a rotatable carrying member and loading spring means located in said space, namely within recesses in said weights, each weight comprising a part pivoted tangentially to said member, said part having an internally screw-threaded aperture extending, in the inner limit position of the weight, substantially parallel to the rotational axis of the carrying member, a heavy, externally screw-threaded plug displaceably engaged in said aperture, and abutment means at both sides of each pivoted part, and said loading spring means bearing in a direction parallel to the governor axis on each adjacent pair of said abutment means.

8. A centrifugal governor including, in combination, a plurality of weights which are complementary sectors occupying in their inner limit positions a cylindrical space, with a rotatable carrying member and loading spring means located in said space, namely within recesses in said weights, each weight comprising a part pivoted tangentially to said member, said part having an internally screw-threaded aperture extending, in the inner limit position of the weight, substantially parallel to the rotational axis of the carrying member, at least one longitudinal groove in the threaded surface of said aperture, a heavy externally screw-threaded plug displaceably engaged in said aperture, a transverse bore in the plug, a spring-loaded catch housed in said bore and projecting therefrom to engage in said groove, and abutment means at both sides of each pivoted part, said loading spring means bearing in a direction parallel to the governor axis on each adjacent pair of said abutment means.

9. A centrifugal governor including, in combination, a rotatable carrying member, two pins mounted symmetrically in said member parallel to one another and tangential to the axis of the member, two weights, each comprising a saddle-shaped part pivotally secured to one of the pins, said part having an internally screw-threaded radial aperture, at least one longitudinal groove in the threaded surface of said aperture, a heavy externally screw-threaded plug displaceably engaged in said aperture, a transverse bore in the plug part, and a spring-loaded catch housed in said bore and projecting therefrom to engage in said groove, abutment means located at the sides of each weight at a smaller distance from the diametrical plane of symmetry than the pivot pins, a keeper plate transversely secured to the carrying member, and loading means bearing in a direction parallel to said axis on each adjacent pair of said abutment means, each loading means comprising at least one helical compression spring seated on said keeper plate.

10. A centrifugal governor including, in combination, two weights, rotatable means carrying said weights in symmetrical disposition, each weight comprising a saddle-shaped part attached to the carrying means, said part having an internally screw-threaded radial aperture, and a heavy, externally screw-threaded plug displaceably engaged in said aperture, like recesses at both sides of each saddle-shaped part, abutment means located one in each of said recesses, and loading spring means disposed in the complementary recesses at each side of the weights transversely to the diametrical plane of symmetry thereof, each loading means engaging the pair of abutment means located in the complementary recesses.

11. A centrifugal governor including, in combination, a rotatable member, two weights carried symmetrically by said member, each weight comprising a saddle-shaped part pivoted tangentially to said member, said part having an internally screw-threaded aperture extending, in the inner limit position of the weight, substantially parallel to the rotational axis of the carrying member, at least one longitudinal groove in the threaded surface of said aperture, a heavy externally screw-threaded plug displaceably engaged in said aperture, a transverse bore in the plug, and a spring-loaded catch housed in said bore and projecting therefrom to engage in said groove, a recess extending transversely to the diametrical plane of symmetry of the weights at each side of said pivoted parts, abutment ledges one at the inner end of each of the complementary recesses at each side, apertures in said ledges, a bolt extending freely through the apertures in each pair of adjacent ledges, nuts on the ends of each bolt, and loading means comprising at least one helical compression spring seated on each of said nuts and bearing on each of said abutment ledges.

12. A centrifugal governor including, in combination, a rotatable member, two weights carried symmetrically by said member, each weight comprising a saddle-shaped part attached to said member, said part having an internally screw-threaded radial aperture, at least one longitudinal groove in the threaded surface of said aperture, a heavy externally screw-threaded plug displaceably engaged in said aperture, a transverse bore in the plug and a spring-loaded catch housed in said bore and projecting therefrom to engage in said groove, like recesses at both sides of each saddle-shaped part, abutment ledges located one in each of said recesses, and loading means comprising at least one compression coil spring secured in each of said recesses transversely to the diametrical plane of symmetry of the weights and bearing on said abutment ledges.

FRANK HAROLD SEELEY.